US007973093B2

(12) United States Patent
Sasagawa et al.

(10) Patent No.: US 7,973,093 B2
(45) Date of Patent: Jul. 5, 2011

(54) FOAMED RUBBER MEMBER

(75) Inventors: Gouki Sasagawa, Tokyo (JP); Naoki Hirakawa, Tokyo (JP)

(73) Assignee: Synztec Co., Ltd., Tokyo (JP)

( * ) Notice: Subject to any disclaimer, the term of this patent is extended or adjusted under 35 U.S.C. 154(b) by 104 days.

(21) Appl. No.: 12/537,273

(22) Filed: Aug. 7, 2009

(65) Prior Publication Data

US 2010/0036005 A1 Feb. 11, 2010

(30) Foreign Application Priority Data

Aug. 7, 2008 (JP) .................................. 2008-204841

(51) Int. Cl.
 C08J 9/30 (2006.01)
 B32B 25/14 (2006.01)
(52) U.S. Cl. ............................. 521/55; 521/54; 428/36.8
(58) Field of Classification Search ................... 521/54, 521/55; 428/36.8
See application file for complete search history.

(56) References Cited

U.S. PATENT DOCUMENTS

| 2007/0104906 A1* | 5/2007 | Hirakawa et al. ............ 428/36.8 |
| 2007/0110936 A1* | 5/2007 | Hirakawa et al. ............ 428/36.8 |

FOREIGN PATENT DOCUMENTS

| JP | 05-077508 | 3/1993 |
| JP | 07-242779 | 9/1995 |
| JP | 08-212828 | 8/1996 |
| JP | 2003-202722 | 7/2003 |
| JP | 2008-015008 | 1/2008 |
| JP | 2008-250064 | 10/2008 |
| JP | 2009-122505 | 4/2009 |

* cited by examiner

Primary Examiner — Randy Gulakowski
Assistant Examiner — Kara Negrelli
(74) Attorney, Agent, or Firm — Young & Thompson

(57) ABSTRACT

An object of the present invention is to provide a foamed rubber member which has low hardness and excellent durability. The foamed rubber member of the invention, produced through an impregnation treatment of a foamed elastic body with a treatment liquid containing an isocyanate compound and an organic solvent, the foamed elastic body being produced by foaming a base rubber, exhibits a compression set smaller than that of the foamed elastic body before undergoing the impregnation treatment, and exhibits a percent increase in stress, with respect to the stress of the foamed elastic body before undergoing the impregnation treatment, of 50% or less.

12 Claims, 4 Drawing Sheets

FOAMED RUBBER MEMBER

The entire disclosure of Japanese Patent Application No. 2008-204841 filed Aug. 7, 2008 is expressly incorporated by reference herein.

BACKGROUND OF THE INVENTION

1. Field of the Invention

The present invention relates to a foamed rubber member which is particularly suitably employed as a paper-feeding/conveying roller employed for feeding/conveying paper sheets in office automation apparatuses such as copying machines, facsimile machines, and printers; and as a charge-imparting roller, a transfer roller, a developing roller, a conductive roller, etc. in image-forming apparatuses.

2. Background Art

Transfer/development rollers and paper-feeding/conveying rollers for use in various office automation apparatuses are requested to be low hardness, in order to prevent damage to members which contact the rollers (e.g., a photoreceptor) Hitherto, such rollers have been formed from EPDM rubber (see, for example, Japanese Patent Application Laid-Open (kokai) Nos. 5-77508 and 7-242779). However, as disclosed in the Patent Documents, for producing solid-rubber rollers having low hardness, a softening agent must be added in a large amount to base rubber. The softening agent in such a large amount may cause staining due to bleeding out of the agent and may result in poor durability of the rollers, both of which are problematic.

Meanwhile, use of a sponge roller (i.e., roller made of a foamed material) is another approach to reduce hardness. Such a sponge roller is advantageous in that the hardness thereof can be readily reduced, that the weight thereof can be reduced, and that paper dust adhering resistance on the sponge roller can be prevented. However, when a sponge roller is operated for a long period of time, in some cases, image failures occur (in the case of transfer/development rollers) and conveying performance is impaired (paper-feeding/conveying rollers), both of which are problematic.

Japanese Patent Application Laid-Open (kokai) No. 2008-15008 discloses a toner-supplying roller having a urethane foam surface layer which has been impregnated, through coating, with an isocyanate compound. The disclosed roller has low hardness, and bleeding of an unreacted polyol component is not observed. However, further improvement is required in the durability of the roller.

SUMMARY OF THE INVENTION

In view of the foregoing, an object of the present invention is to provide a foamed rubber member which has low hardness and excellent durability.

In a first mode of the present invention for attaining the object, there is provided a foamed rubber member, produced through an impregnation treatment of a foamed elastic body with a treatment liquid containing an isocyanate compound and an organic solvent, the foamed elastic body being produced by foaming a base rubber, wherein the foamed rubber member exhibits a compression set smaller than that of the foamed elastic body before undergoing the impregnation treatment, and a percent increase in stress, with respect to the stress of the foamed elastic body before undergoing the impregnation treatment, of 50% or less.

A second mode of the present invention is drawn to a specific embodiment of the foamed rubber member according to the first mode, wherein the compression set is 90% or less that of the foamed elastic body before undergoing the impregnation treatment.

A third mode of the present invention is drawn to a specific embodiment of the foamed rubber member according to the first or second mode, wherein the base rubber is at least one species selected from among epichlorohydrin rubber, acrylonitrile-butadiene rubber (NBR), natural rubber, isoprene rubber, styrene-butadiene rubber, butadiene rubber, chloroprene rubber, fluororubber, chlorinated polyethylene, acrylic rubber, and urethane rubber, and the treatment liquid has an isocyanate compound concentration of 0.1 to 3 mass %.

A fourth mode of the present invention is drawn to a specific embodiment of the foamed rubber member according to the first or second mode, wherein the base rubber is at least one species selected from ethylene-propylene rubber and silicone rubber; the organic solvent is formed of toluene or benzene; and the treatment liquid has an isocyanate compound concentration of 0.1 to 3 mass %.

A fifth mode of the present invention is drawn to a specific embodiment of the foamed rubber member according to any of the first to fourth modes, wherein the foamed elastic body is impregnated with the treatment liquid to a depth of 50% or more the thickness thereof.

A sixth mode of the present invention is drawn to a specific embodiment of the foamed rubber member according to any of the first to fifth modes, which has an Asker C hardness of 0 to 30°.

A seventh mode of the present invention is drawn to a specific embodiment of the foamed rubber member according to any of the first to sixth modes, wherein the treatment liquid contains at least one species selected from among fluoropolymer, silicone polymer, and polyether polymer.

An eighth mode of the present invention is drawn to a specific embodiment of the foamed rubber member according to any of the first to seventh modes, which has a roller shape, a blade shape, or a belt shape.

According to the present invention, a foamed rubber member which has low hardness and excellent durability can be provided.

DETAILED DESCRIPTION OF PREFERRED EMBODIMENTS

Figure 1:
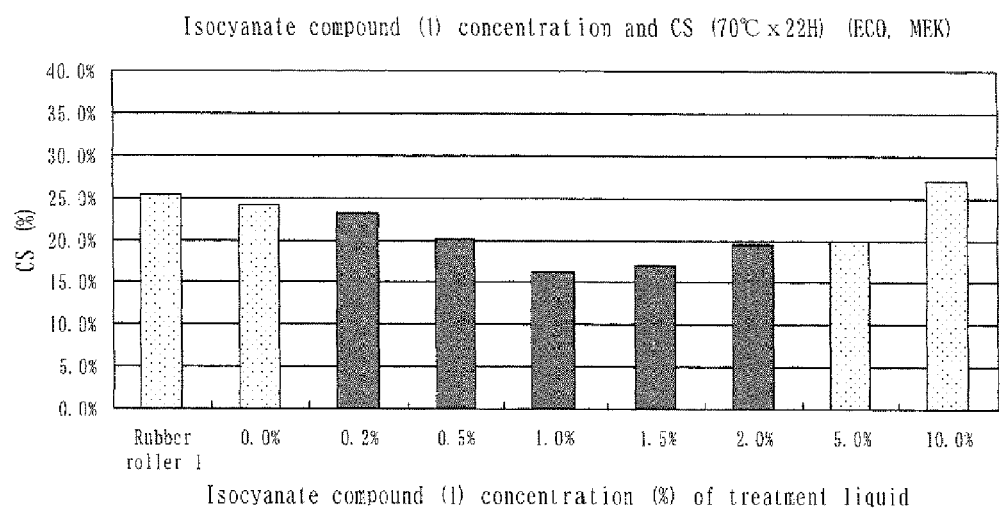
FIGS. 1 to 8 are graphs showing the results of Test Example of the present invention.

The gist of the present invention is to realize a foamed rubber member which has low hardness and excellent durability through subjecting a foamed elastic body to a predetermined impregnation treatment. In other words, the foamed rubber member of the present invention maintains a low hardness originating from a foamed elastic body and exhibits excellent durability by virtue of enhanced dimensional stability.

The foamed rubber member of the invention has been produced through the a predetermined impregnation treatment such that the rubber member exhibits a compression set smaller than that of the foamed elastic body before undergoing the impregnation treatment, and exhibits a percent increase in stress, with respect to the stress of the foamed elastic body before undergoing the impregnation treatment, of 50% or less. As used herein, the term "predetermined impregnation treatment" refers to a treatment with a treatment liquid containing an isocyanate compound and an organic solvent. The treatment liquid preferably has a low isocyanate compound concentration. Through impregnation of a foamed elastic body with a treatment liquid having low isocyanate compound concentration and subsequent curing, the compression set of the foamed elastic body can be reduced with virtually no increase in hardness thereof. By virtue of this treatment, both low hardness and good dimensional stability of the foamed rubber member, which have been difficult to attain, can be realized.

In the foamed rubber member, the treatment liquid has preferably entered the inside of the foamed elastic body in the thickness direction. Through impregnation of the foamed elastic body with the treatment liquid to the inside thereof in the thickness direction, the compression set can be readily reduced, leading to enhancement in dimensional stability. In the state that "the foamed elastic body is impregnated with the treatment liquid to the inside thereof in the thickness direction," when the foamed elastic body is in a roller shape, the treatment liquid has preferably entered the inside thereof in the radial direction. Specifically, the treatment liquid has preferably entered the foamed rubber member at least to a portion thereof that is deformed during use of the member. For example, the foamed elastic body is impregnated with the treatment liquid more preferably to a depth of 50% or more the thickness thereof, particularly preferably to a depth of 80% or more the thickness thereof. Through impregnation of the foamed elastic body with the treatment liquid to the inside thereof in the thickness direction, bleeding of substances such as unreacted components and conductivity-imparting materials present in the foamed elastic body to the surface of the body during deformation by a predetermined compressing load can be prevented. In addition, durability and wear resistance of the formed rubber member are enhanced as compared with those of the foamed elastic body before undergoing impregnation with the treatment liquid.

The foamed elastic body employed in the invention is a foamed product of a base rubber. No particular limitation is imposed on the base rubber, and examples thereof include epichlorohydrin rubber, acrylonitrile-butadiene rubber (NBR), natural rubber, isoprene rubber, styrene-butadiene rubber, butadiene rubber, chloroprene rubber, fluororubber, chlorinated polyethylene, acrylic rubber, and silicone rubber. These base rubbers may be used in combination and, upon combination, these species are appropriately selected in accordance with use and purposes. As mentioned above, no particular limitation is imposed on the base rubber. However, when a base rubber which ensures high permeability of the organic solvent employed in the treatment liquid is employed for the foamed elastic body, the treatment liquid can readily permeate the foamed elastic body in the thickness direction, whereby the compression set of the foamed rubber member can be further reduced.

The foamed elastic body may be imparted with electrical conductivity by use of an conductivity-imparting agent. The conductivity-imparting agent may be an electron-conductivity-imparting agent such as carbon black or metallic powder, an ion-conductivity-imparting agent, or a mixture thereof. Although there are various types of carbon black having different characteristics, carbon micropowder is preferably used. Notably, when the foamed elastic body is molded with addition of carbon black, carbon black is preferably well-dispersed in the base rubber. When dispersion of carbon black is insufficient, the compression set of the molded foamed elastic body tends to increase. Furthermore, when carbon black is added in a large amount, carbon black of such a type as having a small oil absorption, having a large particle size, hardly forming a structure, etc., which is less likely to affect compression set, is preferably used. Examples of the ion-conductivity-imparting agent include an organic salt, an inorganic salt, a metal complex, and an ionic liquid. Examples of the organic salt and inorganic salt include lithium perchlorate, a quaternary ammonium salt, and sodium trifluoroacetate. Examples of the metal complex include ferric halide-ethylene glycol. A more specific example is a complex disclosed in Japanese Patent No. 3655364. Meanwhile, ionic liquid, which is also called ambient temperature molten salt, is a molten salt which is liquid at room temperature, having a melting point of 70° C. or lower, preferably 30° C. or lower. Specific examples of ionic liquid include species disclosed in Japanese Patent Application Laid-Open (kokai) No. 2003-202722.

When the foamed elastic body of the invention is formed through molding of the aforementioned base rubber with carbon black, the mixture is thermally cured with maintaining the carbon black dispersion state. Through the procedure, when a carbon black having an intrinsic volume resistivity of about 0.1 to about 10 $\Omega \cdot cm$ is dispersed in a base rubber, a portion having a middle resistivity range of $10^4$ to $10^8$ $\Omega \cdot cm$ can be reliably formed.

The foamed elastic body may have an open-cell structure or a closed-cell structure However, the open-cell structure is preferred. When the foamed elastic body has an open-cell structure, the foamed elastic body is readily impregnated with a treatment liquid, whereby a foamed rubber member having excellent shape stability can be formed.

The foamed elastic body is molded through mixing the aforementioned base rubber with an optionally added conductivity-imparting material, followed by foaming. The mixture to be molded may further contain a foaming agent, a foaming aid, a vulcanizing agent, a vulcanization accelerator, a filler, etc.

The treatment liquid at least contains an isocyanate compound and an organic solvent (i.e., a solution containing at least an isocyanate compound dissolved in an organic solvent).

Examples of the isocyanate component contained in the treatment liquid include isocyanate compounds such as 2,6-tolylene diisocyanate (TDI), 4,4'-diphenylmethane diisocyanate (MDI), p-phenylene diisocyanate (PPDI), 1,5-naphthalene diisocyanate (NDI), 3,3-dimethyldiphenyl-4,41-diisocyanate (TODI), and modified products and oligomers thereof. A prepolymer formed from a polyol and an isocyanate may also be employed.

The treatment liquid may further contain at least one species selected from among fluoropolymers and silicone polymers. Through incorporation of these polymers into the treatment liquid, adhesion of toner, paper dust, etc. on a foamed rubber member (e.g., paper-feed roller) made from the treated rubber body can be prevented. Thus, clogging of the cells opened to the surface of the foamed rubber member can be prevented, whereby the characteristics of the foamed rubber member can be maintained for a long period of time.

Preferably, the fluoropolymer and silicone polymer employed in the treatment liquid can be dissolved in a specific solvent and can be reacted with an isocyanate compound to form a chemical bond. Examples of the fluoropolymer include an acrylic fluoropolymer, and examples of the silicone polymer include an acrylic silicone polymer. The acrylic fluoropolymer is a fluorine-containing polymer which has, for example, a hydroxyl group, an alkyl group, or a carboxyl group, and can be dissolved in a solvent. Examples include a block copolymer of an acrylic acid ester and a fluoroalkyl acrylate, and derivatives thereof. The acrylic silicone polymer is a silicone-base polymer which is soluble in a solvent.

Examples include a block copolymer of an acrylic acid ester and a siloxane acrylate, and derivatives thereof.

The treatment liquid may further contain a polyether polymer. Preferably, the polyether polymer is soluble in organic solvent and includes active hydrogen, which reacts with an isocyanate to form a chemical bond.

A preferred polyether polymer containing active hydrogen is, for example, epichlorohydrin rubber. The epichlorohydrin rubber used herein refers to unvulcanized epichlorohydrin rubber. Epichlorohydrin rubber is preferably used, since it can impart conductivity and elasticity to the foamed rubber member. Notably, epichlorohydrin rubber per se has active hydrogen (hydroxyl group) at an end. Epichlorohydrin rubber having in a repeating unit active hydrogen such as a hydroxyl group or an allyl group is also preferred. Examples of the epichlorohydrin rubber include epichlorohydrin homopolymer, epichlorohydrin-ethylene oxide copolymer, epichlorohydrin-allyl glycidyl ether copolymer, epichlorohydrin-ethylene oxide-allyl glycidyl ether terpolymer, and derivatives thereof.

Examples of other suitable polyether polymers including active hydrogen include those having a hydroxyl group or an allyl group. Specific examples include polyols and glycols. Such polyether polymers preferably include active hydrogen at one end rather than at both ends. The polyether polymer preferably has a number average molecular weight of 300 to 1,000, from the viewpoint of imparting elasticity to the foamed rubber member. Examples of such polyether polymers include polyalkylene glycol monomethyl ether, polyalkylene glycol dimethyl ether, allylated polyether, polyalkylene glycol diol, and polyalkylene glycol triol. Through incorporation of polyether polymer into the treatment liquid, the softness and strength of the foamed rubber member can be improved. As a result, wearing of the surface of the foamed rubber member of interest and damage of the surface of a counter member can be prevented.

In the case where a silicone rubber is employed as a base rubber, the treatment liquid preferably contains a reactive compound which has compatibility with a silicone rubber. The compound having compatibility with silicone rubber refers to a compound which is compatible with silicone rubber and which can react with silicone rubber or an isocyanate compound. As compared with the case in which a treatment liquid containing only an isocyanate compound having low compatibility with silicone rubber is employed, an elastic layer is readily impregnated with a treatment liquid containing a reactive compound having compatibility with silicone rubber. Examples of the reactive compound include silicon-containing compounds and hydrocarbon compounds. Of these, silicon-containing compounds are particularly preferred. Examples of such silicon-containing compounds include compounds having a siloxane bond, silane coupling agents having an alkoxysilyl group, functional silanes having a chlorosilyl group or silazane, and silylating agents. Of these, compounds having a siloxane bond, and silane coupling agents having an alkoxysilyl group are preferred. Examples of such compounds having a siloxane bond include end-modified dimethylsiloxanes, condensation-type or addition-type liquid silicones, silicate salts, and the aforementioned acrylic silicone polymers. Needless to say, the compound having a siloxane bond may have an alkoxysilyl group at an end of the compound. The reactive compound having compatibility with silicone rubber preferably reacts with an isocyanate compound. For example, the reactive compound preferably has a hydroxyl group, an amino group, an isocyanate group, etc. Through formation of a chemical bond with an isocyanate compound, a foamed rubber member having higher strength can be formed, and bleeding can be prevented. However, in the case of a silane coupling agent having an alkoxysilyl group, when the coupling agent has active hydrogen, the agent readily reacts with an isocyanate compound, reducing stability. Therefore, the coupling agent preferably has an isocyanate group.

The treatment liquid may further contain, as a conductivity-imparting material, an electron-conductivity imparting agent such as carbon black or metallic powder, an ion-conductivity-imparting agent, or a mixture thereof.

The amounts of the fluoropolymer and silicone polymer employed in the treatment liquid are preferably such that the total amount of the polymers is adjusted to 2 to 30 parts by mass with respect to 100 parts by mass of the isocyanate compound. When the total amount is less than 2 parts by mass, the foamed rubber member has poor performance to retain additives such as carbon black, whereas when the polymer amount is in excess of 30 parts by mass, the electrical resistance of the foamed rubber member increases, thereby impairing electric discharge characteristics, and the relative isocyanate amount decreases, thereby failing to attain effective impregnation treatment, which are problematic.

No particular limitation is imposed on the organic solvent, so long as the solvent can dissolve an isocyanate compound and an optional fluoropolymer, silicone polymer, and polyether polymer, and does not react with the isocyanate compound. Examples of the organic solvent include ethyl acetate, methyl ethyl ketone (MEK), methyl isobutyl ketone (MIBK), and toluene. Preferably, the organic solvent readily enters the foamed elastic body, and is appropriately selected in accordance with the type of base rubber of which the foamed elastic body is made.

As mentioned above, the isocyanate compound concentration of the treatment liquid is preferably adjusted to a low level. The isocyanate compound concentration of the treatment liquid varies depending on, for example, the combination of the base rubber and the organic solvent. For example, when at least one species selected from among epichlorohydrin rubber, acrylonitrile-butadiene rubber (NBR), natural rubber, isoprene rubber, styrene-butadiene rubber, butadiene rubber, chloroprene rubber, fluororubber, chlorinated polyethylene, acrylic rubber, and urethane rubber is employed as a base rubber, the concentration is preferably 0.1 to 3 mass %, more preferably 0.2 to 2.0 mass %. When at least one species selected from among ethylene-propylene rubber and silicone rubber is employed as a base rubber, and an organic solvent such as toluene or benzene is employed, the isocyanate compound concentration of the treatment liquid is preferably 0.1 to 3 mass %, more preferably 0.2 to 2.0 mass %. Thus, through impregnation treatment by use of a treatment liquid having considerably low isocyanate compound concentration, a foamed rubber member maintaining low hardness and exhibiting reduced compression set can be provided. In contrast, when a conventional treatment liquid having high isocyanate compound concentration is employed, the cross-linking structure described hereinbelow is excessively formed in the produced foamed elastic body, thereby considerably increasing hardness, increasing stress, and decreasing rubber elasticity of the treated foamed elastic body, as compared with the foamed elastic body before undergoing impregnation treatment with a treatment liquid.

The method for producing the foamed rubber member of the present invention will next be described. Firstly, base rubber is foamed, to thereby form a foamed elastic body. The foamed elastic body is subjected to impregnation treatment by use of a treatment liquid containing at least an isocyanate compound and an organic solvent, to thereby form a foamed rubber member. In the impregnation treatment, a treatment liquid having a low isocyanate compound concentration is employed.

As used herein, the term "impregnation treatment" refers to a procedure including impregnating a foamed elastic body with a treatment liquid, removing the organic solvent of the liquid, and curing the components of the liquid such as an isocyanate compound. The isocyanate compound incorporated into the foamed elastic body reacts with other isocyanate compounds, other components contained in the elastic body (e.g., fluoropolymer), base rubber forming the foamed elastic body, etc., whereby a cross-linking structure containing these components is formed in the foamed elastic body. By virtue of the cross-linking structure, there can be formed a foamed rubber member having more excellent dimensional stability, as compared with that of the foamed elastic body before undergoing impregnation with the treatment liquid.

In a preferred mode of impregnating a foamed elastic body with a treatment liquid, the entirety of the foamed elastic body is impregnated with the treatment liquid through immersing the foamed elastic body in the treatment liquid for a long period of time or immersing the formed elastic body in the treatment liquid with the body being compressed. Impregnation of the entirety of the formed elastic body with the treatment liquid is preferred, since the produced foamed rubber member exhibits a more reduced compression set.

No particular limitation is imposed on the curing process, so long as the process attains curing of components including an isocyanate compound inside the elastic layer. For example, there may be employed a curing process in which the impregnated elastic body is cooled to a temperature below the solidifying point of an isocyanate compound or another component, and curing is performed by water contained in the atmosphere, or a method in which the solvent is evaporated under reduced pressure, and curing is performed by heat or water. Generally, after drying at ambient temperature, the treated body is heated in accordance with need. The heating process is carried out at, for example, 40 to 150° C.

The foamed rubber member, produced through the aforementioned method, exhibits a compression set smaller than that of the foamed elastic body before undergoing impregnation treatment, and exhibits a percent increase in stress with respect to the foamed elastic body before undergoing impregnation treatment is 50% or less. The compression set of the foamed rubber member is more preferably 90% or less, particularly preferably 85% or less of that of the foamed elastic body before undergoing impregnation treatment. Such a foamed rubber member having a small compression set exhibits excellent dimensional stability, thereby maintaining consistent performance for a long period of time. The foamed rubber member more preferably exhibits a percent increase in stress with respect to the foamed elastic body before undergoing impregnation treatment of 30% or less.

The foamed rubber member of the invention preferably has an Asker C hardness of 0 to 30°.

The aforementioned foamed rubber member is particularly suitably employed as a paper-feeding/conveying roller employed for feeding/conveying paper sheets in office automation apparatuses such as copying machines, facsimile machines, and printers; and a charge-imparting roller, a transfer roller, a developing roller, a conductive roller, etc. in image-forming apparatuses.

EXAMPLES

The present invention will next be described in detail by way of examples, which should not be construed as limiting the invention thereto. Unless otherwise specified, the unit "part(s)" is mass basis.

Rubber Roller 1

A vulcanizing agent, a foaming agent, a foaming aid, etc. were added to epichlorohydrin rubber (ECO), and the rubber was vulcanized and foamed at an expansion ratio of 3.0, to thereby produce a roller. The thus-produced roller was polished and cut by means of a cut-off tool, to thereby form a rubber roller 1 (inner diameter: 12 mm, outer diameter: 27 mm, width: 12.5 mm). This rubber roller was found to have an Asker hardness of 19°.

Example 1

An isocyanate-terminated compound having a number average molecular weight less than 500 (MR-400, product of Nippon Polyurethane Industry Co., Ltd., hereinafter referred to as isocyanate compound (1)) (0.2 parts) was added to methyl ethyl ketone (99.8 parts), followed by mixing, to thereby prepare a treatment liquid. Rubber roller 1 was immersed in the treatment liquid maintained at 25° C. for 30 seconds so that rubber roller 1 was sufficiently impregnated with the treatment liquid. The thus-treated roller was dried for one hour without heating, and then heated for one hour in an oven at 120° C., to thereby produce a foamed rubber roller of Example 1.

Example 2

The procedure of Example 1 was repeated, except that the amount of methyl ethyl ketone (MEK) and the amount of isocyanate compound (1) were changed to 99.5 parts and 0.5 parts, respectively, to thereby produce a foamed rubber roller of Example 2.

Example 3

The procedure of Example 1 was repeated, except that the amount of methyl ethyl ketone and the amount of isocyanate compound (1) were changed to 99.0 parts and 1.0 parts, respectively, to thereby produce a foamed rubber roller of Example 3.

Example 4

The procedure of Example 1 was repeated, except that the amount of methyl ethyl ketone and the amount of isocyanate compound (1) were changed to 98.5 parts and 1.5 parts, respectively, to thereby produce a foamed rubber roller of Example 4.

Example 5

The procedure of Example 1 was repeated, except that the amount of methyl ethyl ketone and the amount of isocyanate compound (1) were changed to 98.0 parts and 2.0 parts, respectively, to thereby produce a foamed rubber roller of Example 5.

Comparative Example 1

The procedure of Example 1 was repeated, except that isocyanate compound (1) was not used, to thereby produce a foamed rubber roller of Comparative Example 1.

Comparative Example 2

The procedure of Example 1 was repeated, except that the amount of methyl ethyl ketone and the amount of isocyanate compound (1) were changed to 95.0 parts and 5.0 parts, respectively, to thereby produce a foamed rubber roller of Comparative Example 2.

Comparative Example 3

The procedure of Example 1 was repeated, except that the amount of methyl ethyl ketone and the amount of isocyanate compound (1) were changed to 90.0 parts and 10.0 parts, respectively, to thereby produce a foamed rubber roller of Comparative Example 3.

Example 6

The procedure of Example 1 was repeated, except that an ether-terminated isocyanate prepolymer having a number average molecular weight of about 2,000 (Adiprene L100, product of Uniroyal, hereinafter referred to as isocyanate compound (2)) was used instead of isocyanate compound (1), to thereby produce a foamed rubber roller of Example 6.

Example 7

The procedure of Example 6 was repeated, except that the amount of methyl ethyl ketone and the amount of isocyanate compound (2) were changed to 99.5 parts and 0.5 parts, respectively, to thereby produce a foamed rubber roller of Example 7.

Example 8

The procedure of Example 6 was repeated, except that the amount of methyl ethyl ketone and the amount of isocyanate compound (2) were changed to 99.0 parts and 1.0 parts, respectively, to thereby produce a foamed rubber roller of Example 8.

Example 9

The procedure of Example 6 was repeated, except that the amount of methyl ethyl ketone and the amount of isocyanate compound (2) were changed to 98.5 parts and 1.5 parts, respectively, to thereby produce a foamed rubber roller of Example 9.

Example 10

The procedure of Example 6 was repeated, except that the amount of methyl ethyl ketone and the amount of isocyanate compound (2) were changed to 98.0 parts and 2.0 parts, respectively, to thereby produce a foamed rubber roller of Example 10.

Comparative Example 4

The procedure of Example 6 was repeated, except that the amount of methyl ethyl ketone and the amount of isocyanate compound (2) were changed to 95.0 parts and 5.0 parts, respectively, to thereby produce a foamed rubber roller of Comparative Example 4.

Comparative Example 5

The procedure of Example 6 was repeated, except that the amount of methyl ethyl ketone and the amount of isocyanate compound (2) were changed to 90.0 parts and 10.0 parts, respectively, to thereby produce a foamed rubber roller of Comparative Example 5.

Example 11

The procedure of Example 3 was repeated, except that toluene was used instead of methyl ethyl ketone, to thereby produce a foamed rubber roller of Example 11.

Example 12

The procedure of Example 5 was repeated, except that toluene was used instead of methyl ethyl ketone, to thereby produce a foamed rubber roller of Example 12.

Comparative Example 6

The procedure of Comparative Example 1 was repeated, except that toluene was used instead of methyl ethyl ketone, to thereby produce a foamed rubber roller of Comparative Example 6.

Comparative Example 7

The procedure of Comparative Example 2 was repeated, except that toluene was used instead of methyl ethyl ketone, to thereby produce a foamed rubber roller of Comparative Example 7.

Comparative Example 8

The procedure of Comparative Example 3 was repeated, except that toluene was used instead of methyl ethyl ketone, to thereby produce a foamed rubber roller of Comparative Example 8.

Rubber Roller 2

A vulcanizing agent, a foaming agent, a foaming aid, etc. were added to ethylene-propylene rubber (EPDM), and the rubber was vulcanized and foamed at an expansion ratio of 3.0, to thereby produce a roller. The thus-produced roller was polished and cut by means of a cut-off tool, to thereby form a rubber roller 2 (inner diameter: 12 mm, outer diameter: 27 mm, width: 12.5 mm). This rubber roller was found to have an Asker C hardness of 26°.

Example 13

The procedure of Example 11 was repeated, except that the rubber roller 2 was employed instead of the rubber roller 1, to thereby produce a foamed rubber roller of Example 13.

Example 14

The procedure of Example 12 was repeated, except that the rubber roller 2 was employed instead of the rubber roller 1, to thereby produce a foamed rubber roller of Example 14.

Comparative Example 11

The procedure of Comparative Example 6 was repeated, except that the rubber roller 2 was employed instead of the rubber roller 1, to thereby produce a foamed rubber roller of Comparative Example 11.

Comparative Example 12

The procedure of Comparative Example 7 was repeated, except that the rubber roller 2 was employed instead of the rubber roller 1, to thereby produce a foamed rubber roller of Comparative Example 12.

Comparative Example 13

The procedure of Comparative Example 8 was repeated, except that the rubber roller 2 was employed instead of the rubber roller 1, to thereby produce a foamed rubber roller of Comparative Example 13.

Test Example: Evaluation of Mechanical Characteristics

The rubber rollers 1 and 2 were subjected to measurement of compression set (Cs), as were the foamed rubber rollers of the Examples and Comparative Examples. Compression set was determined in accordance with JIS K6262, with application of 25% compression at 70° C. for 22 hours. Tables 1 and 2 and FIGS. 1, 3, 5, and 7 show the results.

The stress of the rubber rollers 1 and 2 was also measured, as was that of the foamed rubber rollers of the Examples and Comparative Examples. The results are shown in Tables 1 and 2 and FIGS. 2, 4, 6, and 8.

TABLE 1

| | Base rubber | Organic solvent | Isocyanate compound | Isocyanate compound concentration (%) | Cs (%) | Cs (based on rubber roller 1) (%) | Stress (MPa) | Increase in stress (%) | Hardness Asker C (°) |
|---|---|---|---|---|---|---|---|---|---|
| Rubber roller 1 | ECO | — | — | — | 25.37 | — | 0.058 | — | 19 |
| Comp. Ex. 1 | ECO | MEK | — | 0.0 | 24.10 | 95.0 | 0.057 | −1.7 | 18 |
| Ex. 1 | ECO | MEK | 1 | 0.2 | 23.21 | 91.5 | 0.055 | −5.2 | 18 |
| Ex. 2 | ECO | MEK | 1 | 0.5 | 20.12 | 79.3 | 0.060 | 3.4 | 19 |
| Ex. 3 | ECO | MEK | 1 | 1.0 | 16.28 | 64.2 | 0.064 | 10.3 | 21 |
| Ex. 4 | ECO | MEK | 1 | 1.5 | 17.09 | 67.4 | 0.075 | 29.3 | 24 |
| Ex. 5 | ECO | MEK | 1 | 2.0 | 19.54 | 77.0 | 0.080 | 37.9 | 26 |
| Comp. Ex. 2 | ECO | MEK | 1 | 5.0 | 19.83 | 78.2 | 0.125 | 115.5 | 40 |
| Comp. Ex. 3 | ECO | MEK | 1 | 10.0 | 27.05 | 106.6 | 0.337 | 481.0 | 108 |
| Ex. 6 | ECO | MEK | 2 | 0.2 | 21.00 | 82.8 | 0.056 | −3.5 | 18 |
| Ex. 7 | ECO | MEK | 2 | 0.5 | 19.15 | 75.5 | 0.062 | 6.9 | 18 |
| Ex. 8 | ECO | MEK | 2 | 1.0 | 18.19 | 71.7 | 0.061 | 5.2 | 20 |
| Ex. 9 | ECO | MEK | 2 | 1.5 | 18.51 | 73.0 | 0.060 | 3.4 | 20 |
| Ex. 10 | ECO | MEK | 2 | 2.0 | 20.85 | 82.2 | 0.065 | 12.1 | 19 |
| Comp. Ex. 4 | ECO | MEK | 2 | 5.0 | 28.24 | 111.3 | 0.102 | 75.9 | 21 |
| Comp. Ex. 5 | ECO | MEK | 2 | 10.0 | 37.76 | 148.8 | 0.119 | 105.2 | 33 |
| Comp. Ex. 6 | ECO | toluene | — | 0.0 | 23.89 | 94.2 | 0.059 | 1.7 | ** |
| Ex. 11 | ECO | toluene | 1 | 1.0 | 14.94 | 58.9 | 0.068 | 17.2 | ** |
| Ex. 12 | ECO | toluene | 1 | 2.0 | 17.82 | 70.2 | 0.087 | 50.0 | ** |
| Comp. Ex. 7 | ECO | toluene | 1 | 5.0 | 22.36 | 88.1 | 0.136 | 134.5 | ** |
| Comp. Ex. 8 | ECO | toluene | 1 | 10.0 | 27.99 | 110.3 | 0.358 | 517.2 | ** |

**: Not measured

TABLE 2

| | Base rubber | Organic solvent | Isocyanate compound | Isocyanate compound concentration (%) | Cs (%) | Cs (based on rubber roller 2) (%) | Stress (MPa) | Increase in stress (%) |
|---|---|---|---|---|---|---|---|---|
| Rubber roller 2 | EPDM | — | — | — | 29.86 | — | 0.082 | — |
| Comp. Ex. 11 | EPDM | toluene | — | 0.0 | 30.09 | 100.8 | 0.086 | 4.9 |
| Ex. 13 | EPDM | toluene | 1 | 1.0 | 22.93 | 76.8 | 0.092 | 12.2 |
| Ex. 14 | EPDM | toluene | 1 | 2.0 | 24.86 | 83.3 | 0.116 | 41.5 |
| Comp. Ex. 12 | EPDM | toluene | 1 | 5.0 | 28.81 | 96.5 | 0.143 | 74.4 |
| Comp. Ex. 13 | EPDM | toluene | 1 | 10.0 | 32.57 | 109.1 | 0.210 | 156.1 |

Results

Figure 2:
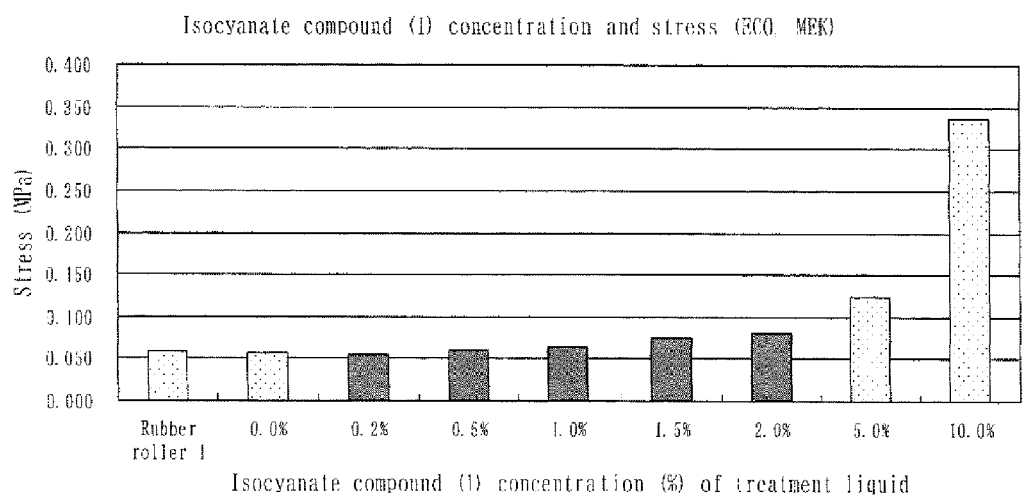

As shown in FIGS. 1 and 2, the foamed rubber rollers of Examples 1 to 5, which had been produced through impregnation treatment of the rubber roller 1 made of epichlorohydrin rubber with a treatment liquid having an isocyanate compound (1) concentration of 0.2 to 2 mass %, exhibited a percent increase in stress of 37.9% or less and a smaller compression set, as compared with the rubber roller 1 and the roller of Comparative Example 1, which had been produced through impregnation treatment by use of an treatment liquid containing no isocyanate compound. Particularly, the foamed rubber roller of Example 3, produced through surface treatment with a treatment liquid having an isocyanate compound concentration of 1.0 mass %, exhibited a decrease in compression set to 64% that of the rubber roller 1. The foamed rubber roller of Example 5 exhibited the highest hardness among the rollers of Examples 1 to 5. However, the Asker C hardness of the roller of Example 5 was as low as 26°.

In contrast, the foamed rubber roller of Comparative Example 2, produced through surface treatment with a treatment liquid having an isocyanate compound concentration as comparatively high as 5 mass %, exhibited a decrease in compression set but a considerable increase in stress. Thus, the roller of Comparative Example 2 no longer exhibited rubber elasticity. The foamed rubber roller of Comparative Example 3 exhibited no drop in compression set and exhibited a considerable increase in stress.

As is clear from FIGS. 1 and 2, when a treatment liquid having a high isocyanate compound concentration was employed, the stress increased excessively, and a decrease in compression set was not observed. However, when the impregnation treatment was performed by use of a treatment liquid having a predetermined isocyanate compound concentration (low-concentration treatment liquid), the foamed rubber members produced through the impregnation treatment exhibited a compression set smaller than that of the foamed elastic bodies before undergoing impregnation treatment, and the percent increase in stress of each foamed elastic body was 50% or less with respect to the foamed elastic bodies before the impregnation treatment. The thus-produced foamed rubber members exhibit both low hardness and dimensional stability, and therefore, can be reliably employed for a long period of time.

Figure 3:
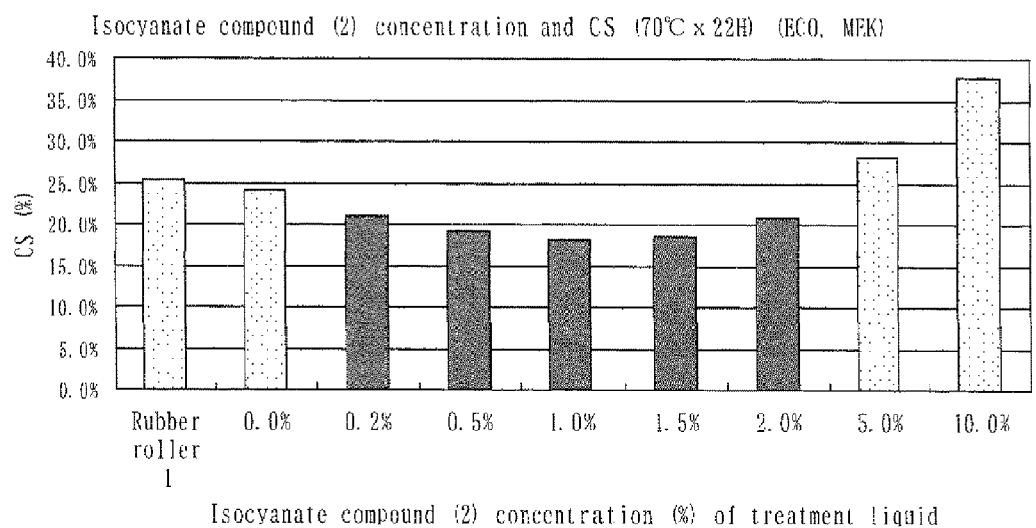
Figure 4:
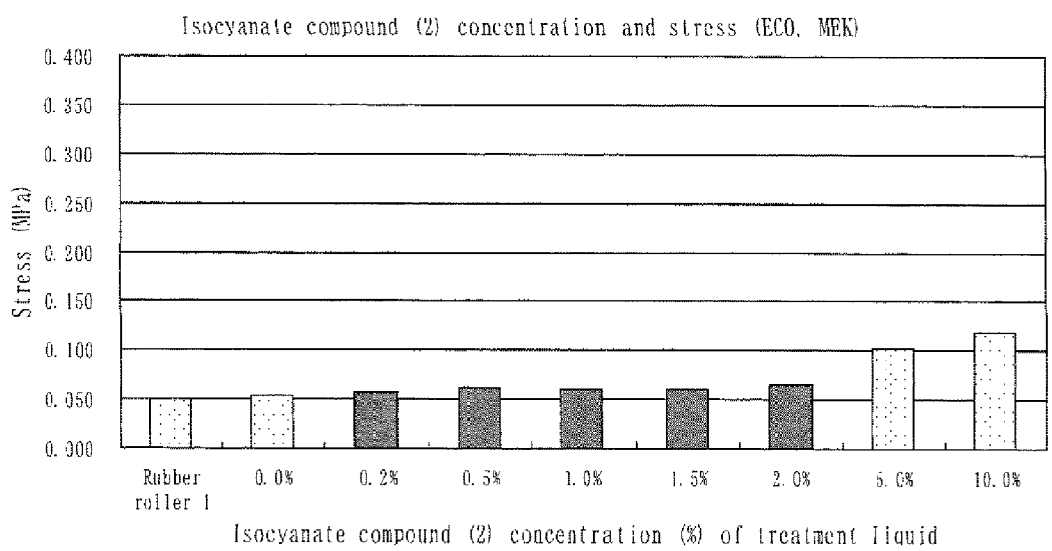

As shown in FIGS. 3 and 4, the foamed rubber rollers of Examples 6 to 10, which had been produced through impregnation treatment with a treatment liquid having an isocyanate compound (2) concentration of 0.2 to 2 mass %, similarly exhibited a smaller percent increase in stress and a smaller compression set, as compared with the rubber roller 1 and the roller of Comparative Example 1. Although the foamed rubber roller of Example 10 exhibited the highest hardness among the rollers of Examples 6 to 10, the Asker C hardness of the roller of Example 10 was as low as 21°. In contrast, the foamed rubber rollers of Comparative Examples 4 and 5, produced through surface treatment with a treatment liquid having a high isocyanate compound concentration, exhibited a considerable increase in compression set and no longer exhibited rubber elasticity. Therefore, when the impregnation treatment is performed by use of a treatment liquid having a predetermined isocyanate compound concentration (i.e., low concentration), foamed rubber members exhibiting a small compression set and a low hardness can be provided, regardless of the type of the isocyanate compound.

Figure 5:
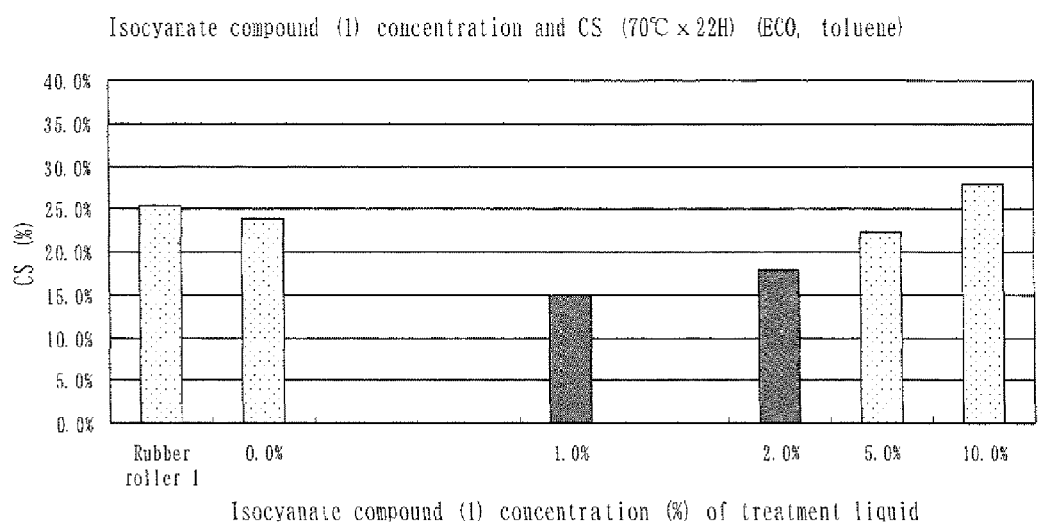
Figure 6:
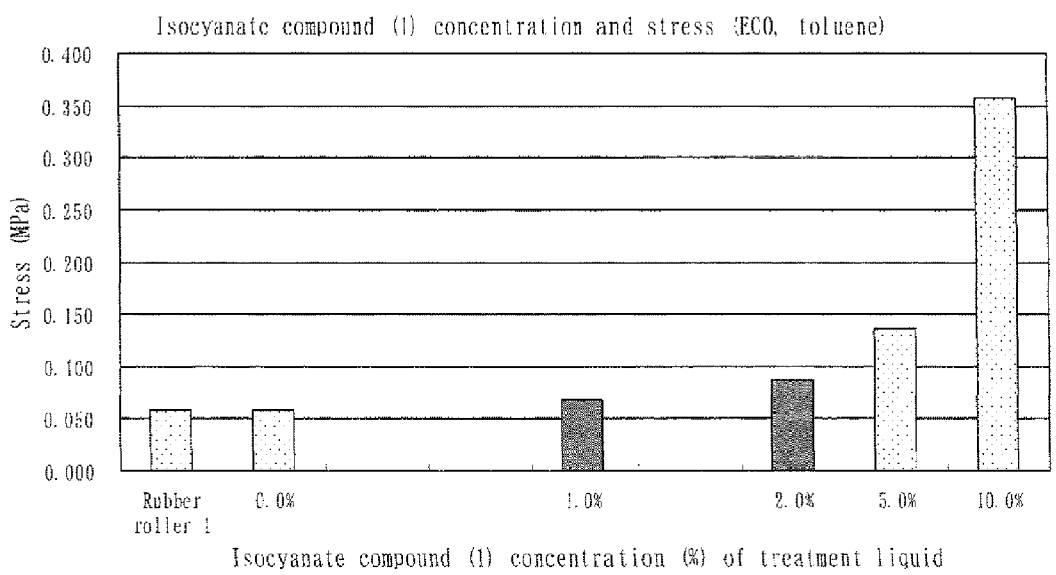

Meanwhile, as shown in FIGS. 5 and 6, in the case where a treatment liquid containing toluene as an organic solvent is employed, the impregnation treatment performed by use of a treatment liquid having a predetermined isocyanate compound concentration (i.e., low concentration) also results in production of foamed rubber members exhibiting a small compression set and a low hardness.

Figure 7:
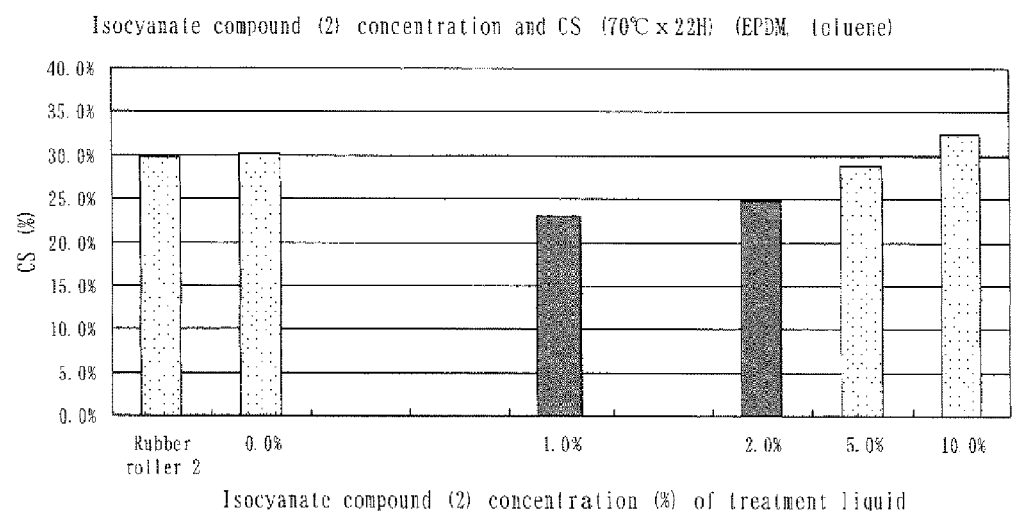
Figure 8:
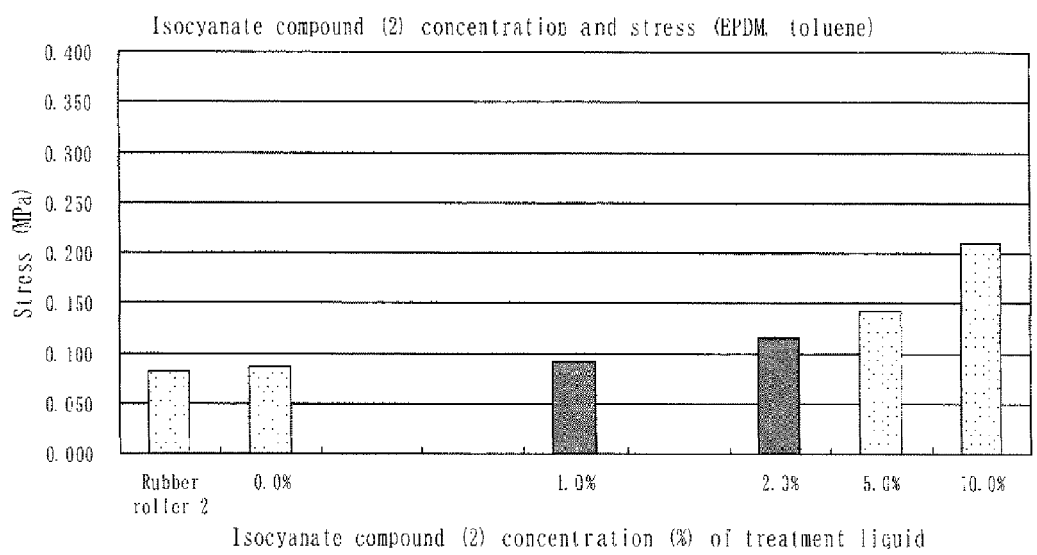

As shown in FIGS. 7 and 8, in the case where a treatment liquid containing toluene as an organic solvent is employed, the impregnation treatment performed by use of a treatment liquid having an isocyanate compound concentration of 1 mass % or 2 mass % leads to a considerable decrease in compression set. Such a decrease in compression set is thought to be caused by high permeability of toluene to ethylene-propylene rubber, attaining entry of the treatment liquid into the inside of each foamed elastic body.

Significantly decreasing the compression set of foamed rubber members requires a low isocyanate compound concentration and an appropriate combination of the base rubber and the organic solvent. By use of a base rubber which allows easy permeation of an organic solvent, or by use of an organic solvent which permeates a base rubber to a great extent, foamed rubber members exhibiting small compression set and excellent dimensional stability can be readily produced.

What is claimed is:

1. A foamed rubber member, produced through an impregnation treatment of a foamed elastic body with a treatment liquid containing an isocyanate compound and an organic solvent, the foamed elastic body being produced by foaming a base rubber,
   wherein the foamed rubber member exhibits a compression set smaller than that of the foamed elastic body before undergoing the impregnation treatment, and a percent increase in stress, with respect to the stress of the foamed elastic body before undergoing the impregnation treatment, of 50% or less,
   the base rubber comprises at least one species selected from the group consisting of epichlorohydrin rubber, acrylonitrile-butadiene rubber, natural rubber, isoprene rubber, styrene-butadiene rubber, butadiene rubber, chloroprene rubber, fluororubber, chlorinated polyethylene, acrylic rubber, and urethane rubber, and
   the treatment liquid comprises an isocyanate compound at a concentration of 0.1 to 3 mass %.

2. A foamed rubber member according to claim 1, wherein the compression set is 90% or less that of the foamed elastic body before undergoing the impregnation treatment.

3. A foamed rubber member according to claim 1, wherein the foamed elastic body is impregnated with the treatment liquid to a depth of 50% or more of a thickness of the foamed rubber member.

4. A foamed rubber member according to claim 1, which has an Asker C hardness of 0 to 30°.

5. A foamed rubber member according to claim 1, wherein the treatment liquid contains at least one species selected from among fluoropolymer, silicone polymer, and polyether polymer.

6. A foamed rubber member according to claim 1, which has a roller shape, a blade shape, or a belt shape.

7. A foamed rubber member, produced through an impregnation treatment of a foamed elastic body with a treatment liquid containing an isocyanate compound and an organic solvent, the foamed elastic body being produced by foaming a base rubber,
   wherein the foamed rubber member exhibits a compression set smaller than that of the foamed elastic body before undergoing the impregnation treatment, and a percent increase in stress, with respect to the stress of the foamed elastic body before undergoing the impregnation treatment, of 50% or less, the base rubber comprises at least one species selected from the group consisting of ethylene-propylene rubber and silicone rubber, the organic solvent comprises at least one species selected from the group consisting of toluene and benzene, and the treatment liquid comprises an isocyanate compound at a concentration of 0.1 to 3 mass %.

8. A foamed rubber member according to claim 7, wherein the compression set is 90% or less that of the foamed elastic body before undergoing the impregnation treatment.

9. A foamed rubber member according to claim 7, wherein the foamed elastic body is impregnated with the treatment liquid to a depth of 50% or more of a thickness of the foamed rubber member.

10. A foamed rubber member according to claim 7, which has an Asker C hardness of 0 to 30°.

11. A foamed rubber member according to claim 7, wherein the treatment liquid contains at least one species selected from among fluoropolymer, silicone polymer, and polyether polymer.

12. A foamed rubber member according to claim 7, which has a roller shape, a blade shape, or a belt shape.

\* \* \* \* \*